Patented July 21, 1931

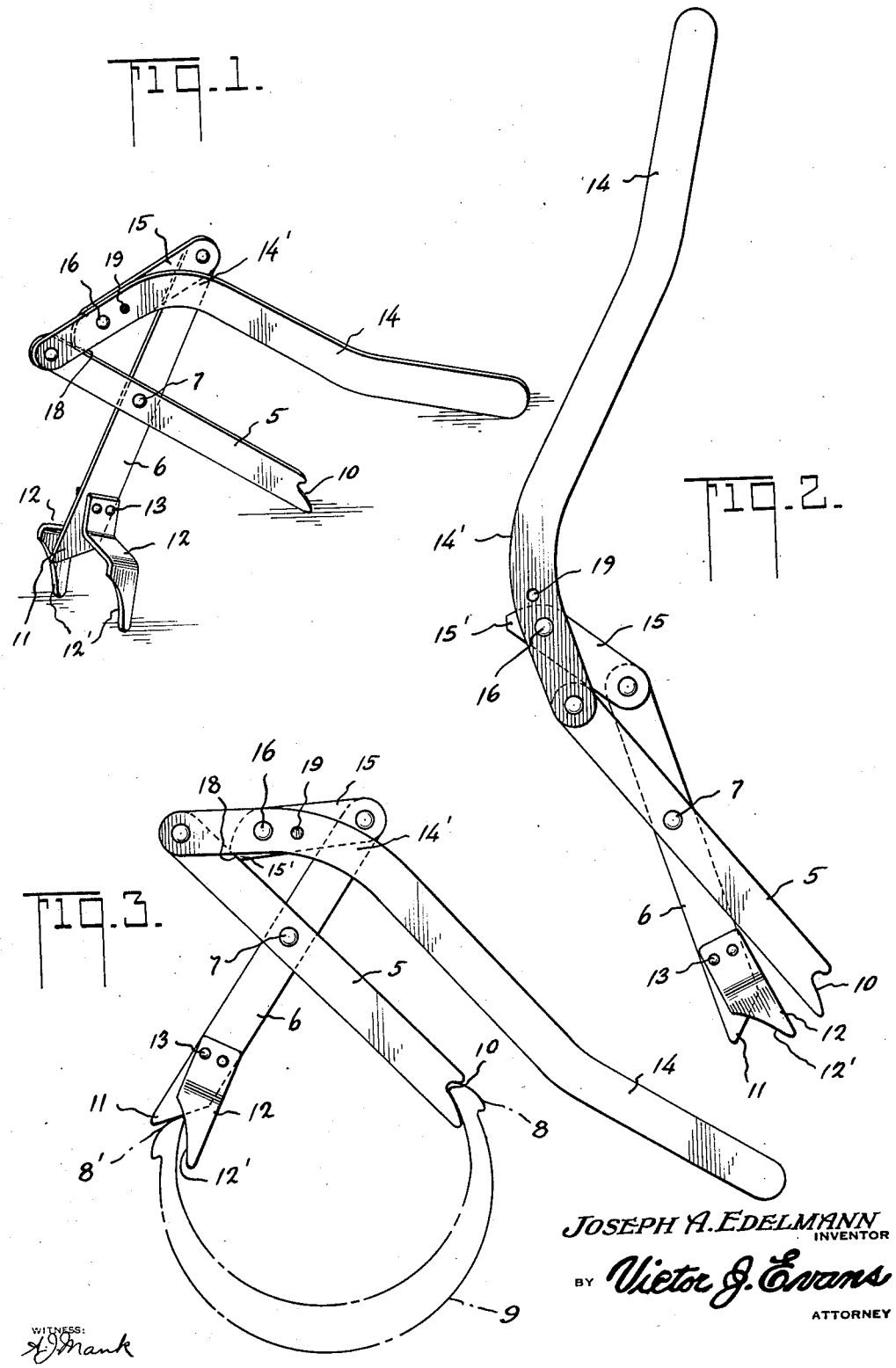

1,815,764

UNITED STATES PATENT OFFICE

JOSEPH A. EDELMANN, OF UNION, NEW JERSEY

TIRE SPREADER

Application filed December 20, 1930. Serial No. 503,811.

This invention relates to improvements in tire spreaders and has for its principal object the provision of a simple tool for spreading apart the inner circumferential edges of a pneumatic tire casing.

Another object of the invention is to provide a strong and durable device of simple and inexpensive construction which may be conveniently used to spread apart, and maintain in a spread condition, the edges of a casing in order that same may be inspected and repaired.

The invention also contemplates the provision of a simplified tool for spreading a tire wherein the tool operates on the inner side of the tire, instead of on the outer side, in order that the tire may rest on the floor in a vertical position while same is being repaired.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings which latter show embodiments of the invention as at present preferred.

In said drawings

Fig. 1 is a perspective view of the embodiment.

Fig. 2 is a side elevation of same in a closed position.

Fig. 3 is a side elevation of the device showing the tire in its spread or opened position.

Referring now more particularly to said drawings, the embodiment is at present preferred includes a pair of arms or levers 5 and 6 which are centrally pivoted at 7. These levers have means at one end thereof for engaging the inner circumferential edges 8 and 8' of a casing 9. The lever 5 is provided, at this end, with a slotted portion 10 which engages the edge 8 of the tire. The other lever 6 has an end portion 11 which is cut away at an angle, as shown, and carries on each side thereof an S-shaped angle plate 12, each of said angle plates being secured to the end portion of the lever by means of rivets 13. The opposite ends of these angle plates have a cut away portion 12. Thus it will be seen that the other edge 5' of the casing is engaged between the end portion 11 of the lever 6 and the cut away portion 12' of the angle plates 12. These two angle plates provide a support for the device in order to keep same in an upright position while in use.

The opposite end of the lever 5 pivotally carries a handle 14 which is preferably curved at 14. The corresponding end of the lever 6 pivotally carries a short link 15 which is pivotally connected to the handle 14 at 16.

When it is desired to use the device the parts are closed to the position illustrated in Fig. 2. The lower portions 10 and 11, of the tool are inserted in the inner edges 8 and 8' of the tire. The handle is then pushed down, thereby spreading the free ends of the arms and opening the casing. When the pivot 16 gets past the center line between the pivots at the ends of the arms the flat end portion 15' of the link 15 engages the side of the arm 5 at 18, thereby bringing about a condition, due to the center of pivot 16 being below the line last mentioned, such that, the tool is automatically locked by the reactive pressure from the tire against the jaws of the tool.

An auxiliary hole 19 is provided in the handle 14 in order to change the pivot 16 in case a wider opening is desired.

The hereinbefore described construction admits of considerable modification without departing from the invention; therefore, it is the wish not to be limited to the precise arrangements shown and described, which are as aforesaid, by way of illustration merely. In other words the scope of protection contemplated is to be taken solely from the appended claim, interpreted as broadly as is consistent with the prior art.

What is claimed as new is:—

In a tire spreader, the combination of a pair of arms centrally pivoted together and having jaws at one end thereof for engaging the inner circumferential edges of a tire, an operating lever pivotally secured to the opposite end of one of said arms and a link pivotally secured to the opposite end of the other arm and also pivotally secured to said operating lever, and an extension portion integral with one end of said link and adapted to engage the side of one of said arms when the tire engaging ends of said arms are spread apart.

In testimony whereof I hereby affix my signature.

JOSEPH A. EDELMANN.